United States Patent
Holeschovsky et al.

(10) Patent No.: US 6,264,775 B1
(45) Date of Patent: Jul. 24, 2001

(54) FACE-UP COATING OF CARPET BACKS WITH POLYURETHANE

(75) Inventors: Ulrich B. Holeschovsky, Exton; Jeffrey L. Robbins; Harry Stefanou, both of Strafford, all of PA (US); Leah Langsdorf, Akron, OH (US); David Gibala, Downingtown, PA (US); Robert R. Pollock, Pottstown, PA (US)

(73) Assignee: Bayer Antwerp N.V., Antwerp (BE)

( * ) Notice: Subject to any disclaimer, the term of this patent is extended or adjusted under 35 U.S.C. 154(b) by 0 days.

(21) Appl. No.: 09/219,166

(22) Filed: Dec. 22, 1998

(51) Int. Cl.[7] ............................... B32B 33/00; B05D 3/10
(52) U.S. Cl. .................... 156/72; 156/331.4; 156/331.7; 428/96; 428/97
(58) Field of Search .................. 156/72, 435, 331.4, 156/331.7; 428/96, 97

(56) References Cited

U.S. PATENT DOCUMENTS

| | | | |
|---|---|---|---|
| 3,928,281 | * 12/1975 | Uchigaki et al. | 260/42.39 |
| 3,957,555 | * 5/1976 | Bondi | 156/72 |
| 4,515,646 | * 5/1985 | Walker et al. | 156/78 |
| 4,649,224 | 3/1987 | Panek et al. | |
| 4,696,849 | 9/1987 | Mobley et al. | |
| 4,709,099 | 11/1987 | Panek et al. | |
| 4,853,054 | 8/1989 | Turner et al. | |
| 5,045,375 | * 9/1991 | Davis et al. | 428/96 |
| 5,158,922 | 10/1992 | Hinney et al. | |
| 5,482,908 | 1/1996 | Le-Khac | |
| 5,604,267 | 2/1997 | Duffy | |

OTHER PUBLICATIONS

ASTM D–2849–69, Standard Methods of Testing of Urethane Foam Polyol Raw Materials, pp. 913–931.
ASTM D–1355–67, Standard Test Method for Tuft Bind of Pile Floor Coverings, pp. 345–347.
ASTM D–412–92, Standard Test Methods for Vulcanized Rubber and Thermoplastic Rubbers and Thermoplastic Elastomers—Tension, pp. 1–13.

* cited by examiner

Primary Examiner—Sam Chuan Yao
(74) Attorney, Agent, or Firm—Brooks & Kushman P.C.

(57) ABSTRACT

Tufted carpeting can be manufactured employing polyurethane adhesives and cured face up without dripping, when one or more drip-reducing process steps of adding a non-Newtonian thickener to the adhesive or forming a viscosified or cured film on the outer surface of the adhesive are practiced prior to entry of the greige good into the curing oven.

14 Claims, 4 Drawing Sheets

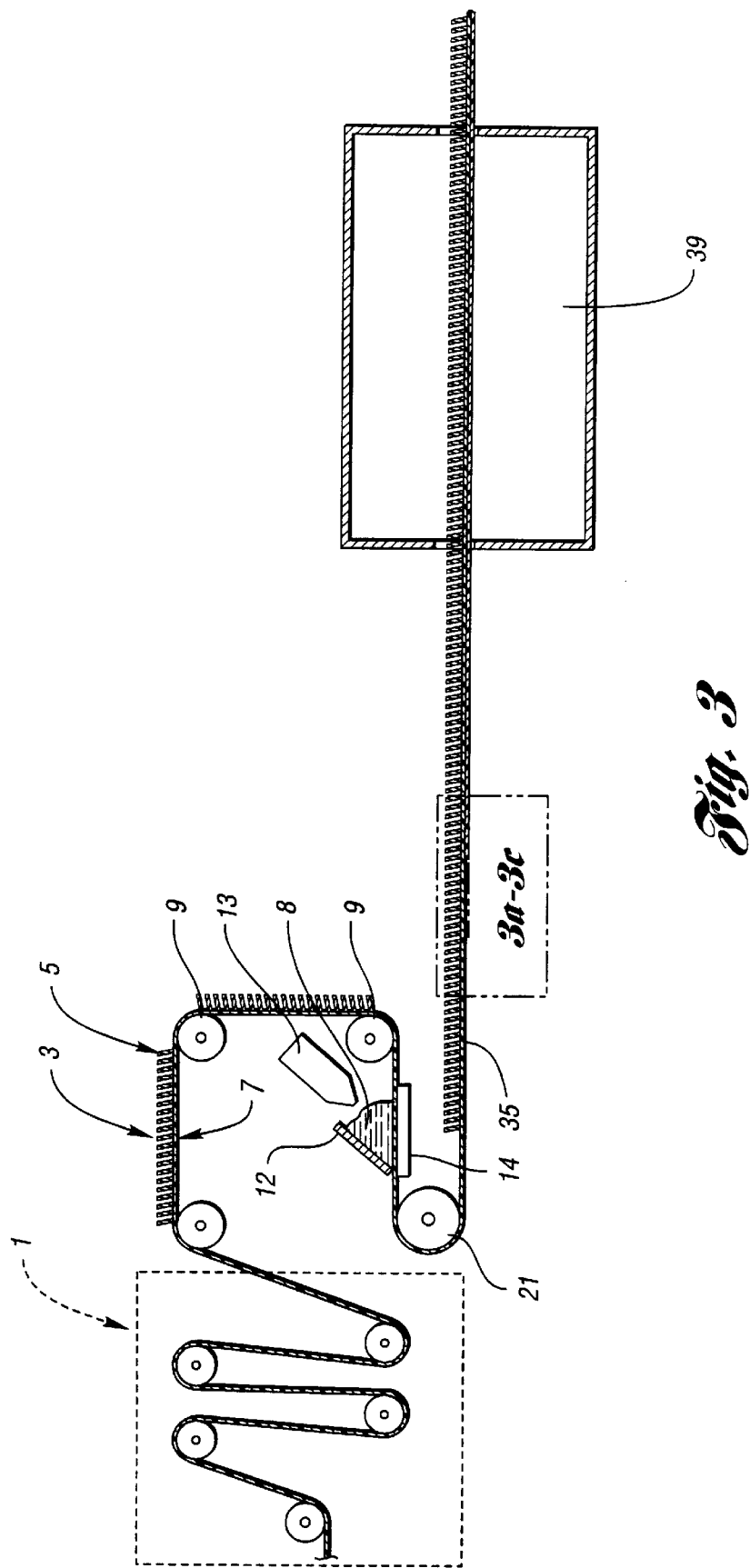

FACE-UP COATING OF CARPET BACKS WITH POLYURETHANE

TECHNICAL FIELD

The present invention pertains to a process for preparing tufted carpeting in which polyurethane adhesives are used, and to a process where the curing of the adhesive-coated carpet may be achieved face up.

BACKGROUND ART

Carpets are generally produced by tufting carpet yarns into a primary backing, the tufts being secured in the primary backing through use of a "precoat" or "tuft bind" adhesive. The greige good thus prepared may optionally be coated with adhesive and secured to a secondary backing, generally of polypropylene or jute. Key properties of the carpeting produced by these processes are tuft bind, the strength required to pull tufts from the primary backing, and delamination strength, the force required to separate the secondary backing from the carpet.

High values of tuft bind are obtained from high strength adhesives which thoroughly wet out both the tufts and the primary backing. In order to achieve suitable delamination strength, the secondary backing must be in intimate contact with the tufted yarn/primary backing ("greige good") during the curing process, and a sufficient amount of adhesive which ensures complete wet out of the tufted fibers and secondary backing and which promote a good marriage between these components must be used.

In the past, SBR latex has been almost exclusively used as both the tuft bind adhesive and the laminating adhesive. The latex may be applied by numerous methods, such as the indirect applicator (pan application) which is now used infrequently, and "direct" methods, these involving roll over flatbed or roll over roll processes, either as a single unitary process, or in series as a tandem process. Regardless of the actual method used, the reverse of the greige good is coated with a precoat of adhesive, and the secondary backing, also coated with adhesive, is married to the greige good, and cured. In these processes, the carpets are coated face down, but cured "face up", i.e., with the aesthetic side of the carpet uppermost.

While SBR latex has been the adhesive of choice, carpet prepared from SBR latex also exhibits numerous deficiencies. For example, the tensile strength and hydrolytic stability of SBR latexes is less than desired, and SBR polymers are less durable than desired. Greige goods in which SBR latexes are used as tuft bind adhesives are subject to "rewicking". Moreover, use of SBR latexes requires the evaporation of large quantities of water during cure, a process which is energy intensive. Polyurethane adhesives are capable of forming a laminate with superior tuft bind and delamination strength, as well as improving other desirable physical properties. However, technical problems have prevented widespread use of polyurethanes despite the increased performance potential.

Substitution of reactive polyurethane systems for latex laminating adhesives has not been straight forward, and has required numerous process modifications. For example, conventional latex maintains its tackiness and viscosity during processing, even in the curing oven. Following application of latex adhesive, the back-side of the greige goods is faced downward. A coat of additional latex is applied to the secondary backing by a skip roll. As a result of the latex properties, good temporary adherence of the secondary backing to the greige goods is obtained. In the curing oven, the latex viscosity does not drop significantly as water evaporates. Thus, the secondary backing satisfactorily adheres to the greige goods, and dripping of latex from the bottom of the laminate into the oven does not occur.

With polyurethanes, however, the single adhesive application common with latex has not been found operable. Polyurethane froth adhesives are not as inherently tacky as SBR latex. Following application of polyurethane adhesive to the greige good and the working of the adhesive into the tufts by means of a closely spaced doctor bar or similar device, a considerable additional amount of polyurethane must be applied from a second puddle in order to provide enough adhesive to temporarily adhere the secondary backing. Even with this additional adhesive, the slow advancement of the adhesive and its low level of tack does not allow for the desired adherence between the greige goods and secondary backing.

In the curing oven, polyurethanes generally exhibit a considerable initial decrease in viscosity prior to cure. As a result, unless the carpet laminating line is run with the greige goods reverse side uppermost, considerable loss of polyurethane into the curing oven would occur. Moreover, if sufficient initial adherence of secondary backing to the greige good has not been obtained, separation of the secondary backing may occur during this period of low viscosity. The viscosity of the polyurethane adhesive may decrease to only 10% of its initial value prior to the viscosity rising as the catalyzed urethane-forming reaction begins to exert its effect. The period of greatest viscosity decrease is often exhibited over the temperature range of ambient to 70° C., where the polyurethane catalysts are not optimally active.

Due to the decrease in viscosity exhibited by polyurethane adhesives, carpets employing polyurethane adhesives cannot be cured "face up" with or without a secondary backing. The low viscosity allows the adhesive to drip to the floor of the oven or oven belt, eventually creating a buildup which must be removed; causing smoke and odor to be produced; and creating a risk of fire. Addition of secondary backing can minimize the dripping, but generally does not alleviate it altogether. Moreover, the low viscosity of the adhesive may allow the secondary backing to sag and pull away from the carpet, and migration of low viscosity polyurethane through the relatively large holes of the backing create drips and runs which render the carpet commercially unacceptable. These problems have proven to be major obstacles to acceptance of polyurethane adhesives in carpet manufacturing. The capital investment required to convert conventional latex adhesive lines to polyurethane adhesive lines, where the carpet runs face down in the oven, is considerable.

Simply raising the viscosity of the reactive polyurethane adhesive, for example by employing more viscous polyols or prepolymers can assist in lowering dripping and running. However, the higher viscosity impedes impregnation and wet-out of tuft ends and primary backing. Tuft bind then suffers considerably.

DISCLOSURE OF INVENTION

It would be desirable to employ a polyurethane adhesive in the manufacture of carpets which exhibits good tuft bind while able to be run on carpet manufacturing lines "face up", as practiced with conventional latex adhesive carpet manufacturing equipment, without dripping or running due to changes in viscosity in the cure oven. It has now been surprisingly discovered that polyurethane adhesives containing non-Newtonian thickeners and/or thickeners which cause the polyurethane viscosity to be less sensitive to temperature changes, are suitable for accomplishing the above objectives. It has further been discovered that the use of a surface viscosified means, preferably a non-advancing viscosifying composition, particularly when employing a secondary backing, are useful as well, either alone or in conjunction with non-Newtonian thickened systems or temperature insensitive systems.

BRIEF DESCRIPTION OF DRAWINGS

FIG. 3 illustrates a further embodiment of the subject invention.

DESCRIPTION OF THE PREFERRED EMBODIMENTS

The various embodiments of the subject invention may best be understood following a description of the drawings, which have been simplified for ease of understanding.

Figure 1:
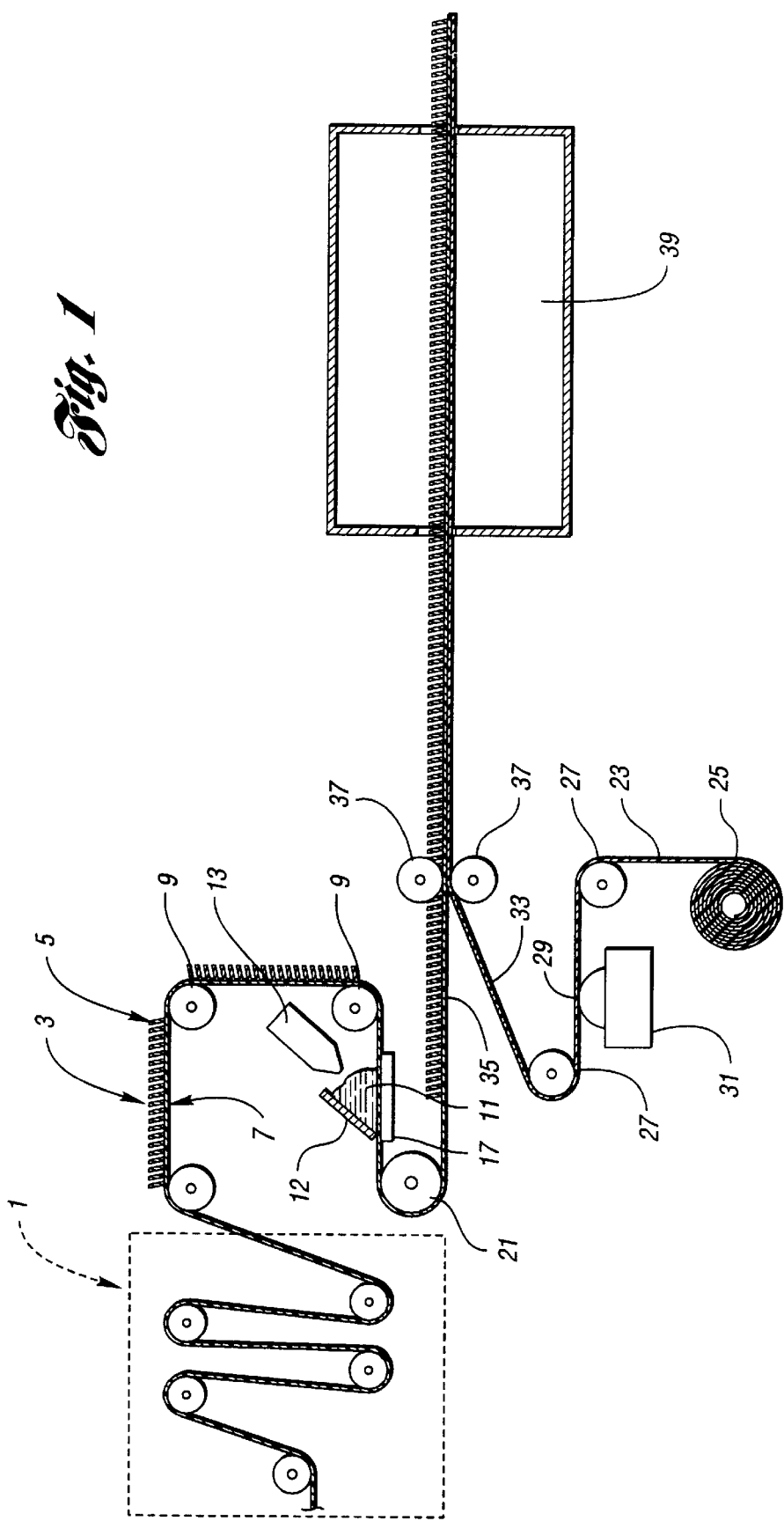
FIG. 1 illustrates a typical latex-based carpet laminating process, and one embodiment of the subject process when modified as described herein.

FIG. 1 illustrates a typical, commercial, SBR latex-based carpet laminating process. In the dashed box labeled 1, preliminary carpet operations such as correction of bowing and skewing, which do not form a part of the coating and/or laminating processes per se, are practiced. The greige good 3, with carpet exterior 5 uppermost and the reverse side 7 to which tuft bind adhesive must be applied lowermost, is redirected by means of rollers 9 to place the reverse side of the greige goods under puddle 11, which is supplied with latex adhesive through supply line 13. Doctor blade or gauge bar 12, in conjunction with platen 17, adjusts the amount of latex applied, and assists also in forcing the latex into the tuft ends. The carpet is then redirected by roller 21. Secondary backing 23 is supplied from supply roll 25 and directed by rollers 27 across skip roll 29, which rotates in trough 31 filled with additional latex. Skip roll 29 and trough 31 together comprise a "skip coater". The skip coated secondary backing 33 is pressed onto the latex adhesive-coated greige goods 35 by their travel through marriage rolls 37. The carpet then passes through curing oven 39 where water is removed from the latex, and the latex cures, adhering tufts and secondary backing to form a laminated carpet. The carpet cures face up. If non-laminated carpet is desired, the secondary backing lamination steps are eliminated.

Figure 2:
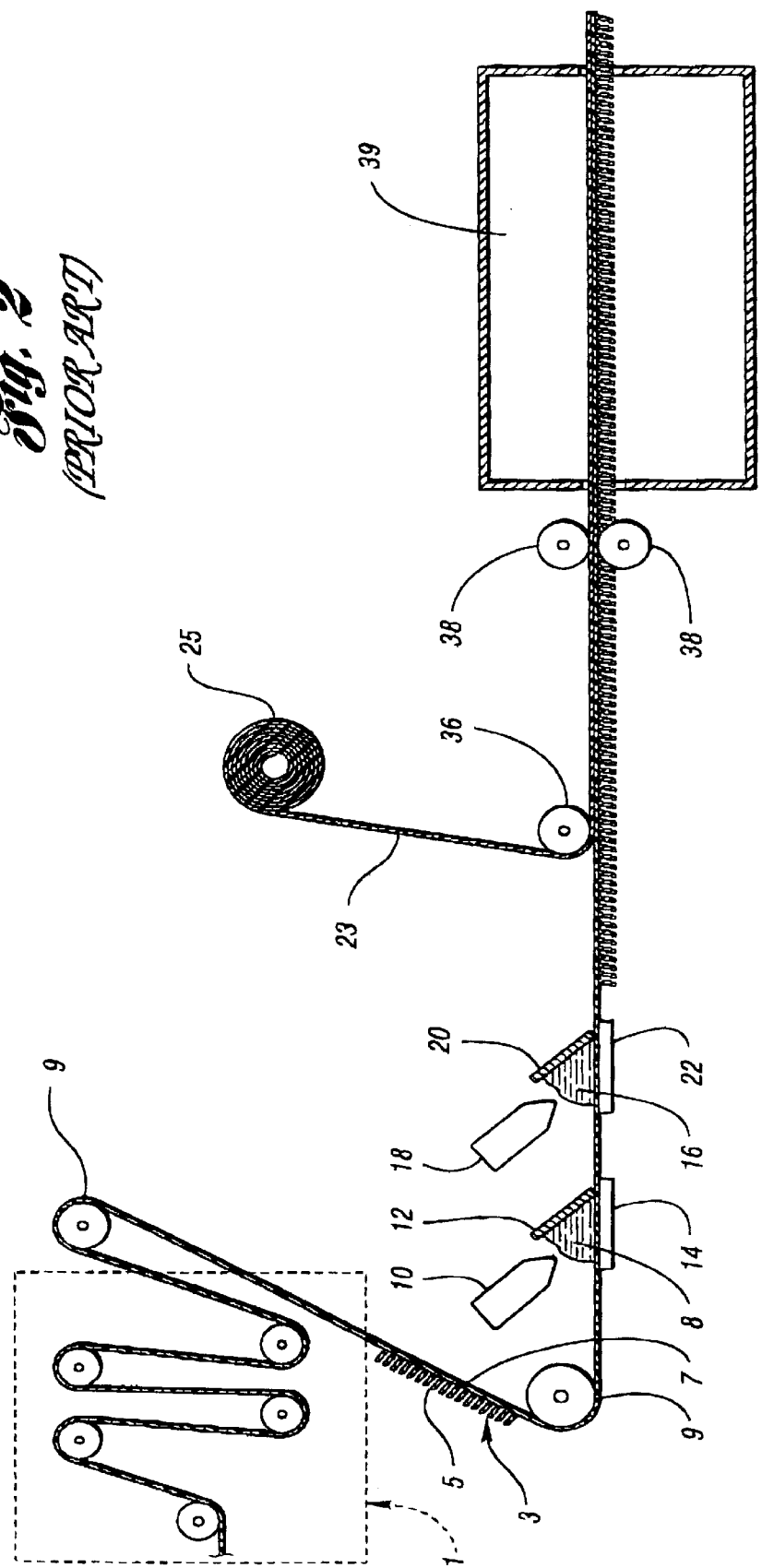
FIG. 2 illustrates a two puddle polyurethane-based carpet laminating system.

FIG. 2 illustrates a commercial two puddle polyurethane system. Dashed box 1 provides the same carpet preparation activities as in FIG. 1. To the reverse side 7 of the greige goods, polyurethane is applied from puddle 8, supplied with polyurethane froth adhesive through supply line 10. Doctor blade 12, in cooperation with platen 14, limits the applied weight of polyurethane and forces it into the greige goods. The "puddle" collects prior to the doctor blade. Following the first puddle 8 is second polyurethane adhesive puddle 16, supplied with frothed polyurethane adhesive from supply line 18. Doctor blade 20, in conjunction with platen 22, adjusts the thickness of the deposited adhesive. While the first doctor blade 12 substantially contacts the reverse of the greige good, the second doctor blade is spaced a distance away to allow enough adhesive to be deposited to temporarily (prior to cure) bind the secondary backing, when a secondary backing is desired. The secondary backing 23, supplied from supply roll 25, contacts the adhesive-coated greige good below roller 36. Prior to entry into the curing oven, press rollers 38 assist in maintaining stable contact between the secondary backing and the greige goods. Curing the laminate is accomplished by curing oven 39. Note that the carpet is cured face side down.

FIG. 1 also serves to illustrate one embodiment of the subject invention, except that instead of puddle 11 delivering latex to the carpet back, the puddle supplies and polyurethane adhesive, as was employed in FIG. 2. However, unlike FIG. 2, it must be emphasized that the carpet is cured in FIG. 1 by passing face up through the curing oven 39. A further difference between the subject invention process and prior art latex processes is that the skip coater 31 will contain a non-advancing viscosifying composition rather than further latex as in a latex adhesive-based process. For example, the viscosifying composition may contain a polyol with relatively high levels of tin and amine catalysts.

In FIG. 3, carpet is produced as in FIG. 1, in accordance with the subject invention, but without secondary backing. Thus the secondary backing roll, skip coater, and associated elements of FIG. 1 are absent. In FIG. 3, surface viscosifying means 3a–3c are optionally used.

Figure 3A:
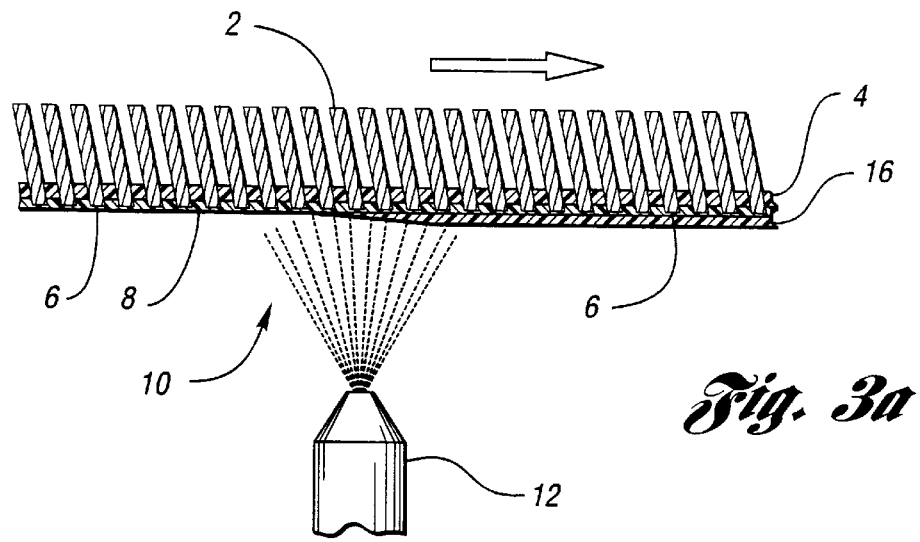
FIGS. 3a–3c illustrates use of several optional viscosifying means of the subject invention.

In FIG. 3a, a very reactive viscosifying composition, or one containing significant amounts of urethane promoting catalyst, 10, is sprayed from spray nozzle 12 onto the surface of the adhesive 8 coating the primary backing 4 and tuft ends 6 of tufts 2. The fast reacting and/or catalyst loaded composition causes viscous or cured layer 16 to be formed on the surface of adhesive 8.

Figure 3B:
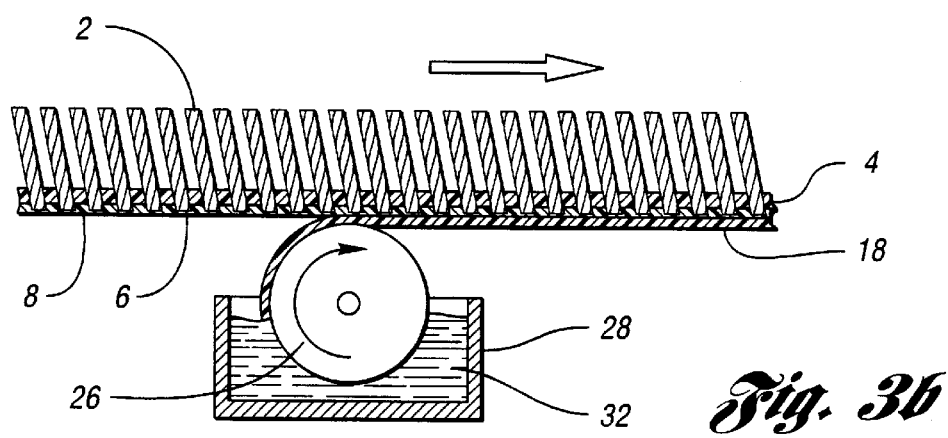

In FIG. 3b, an alternative method of applying the composition used in FIG. 4a employs a skip coater having a reservoir 28 which contains the viscosifying composition 32, applied to the surface of the polyurethane adhesive 8 by skip roll 26. The composition causes partially or fully cured layer 18 to be formed.

Figure 3C:
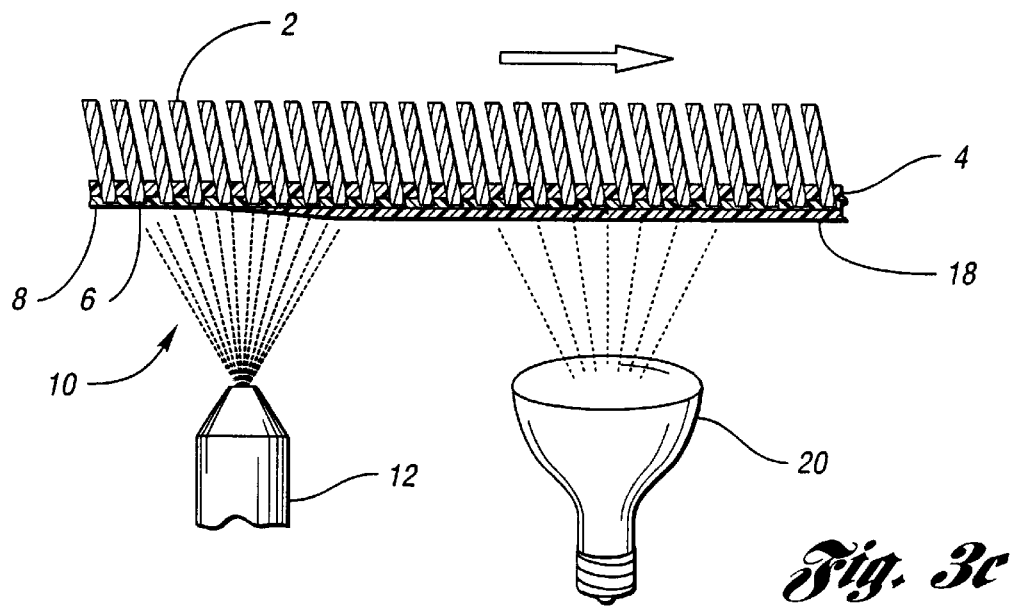

In FIG. 3c, a spray nozzle 12 supplies a photocurable composition as a mist 10 to the surface of polyurethane adhesive 8. Ultraviolet lamp 20 cures or partially cures the photocurable composition to form a viscous to solid film 18. In an alternative embodiment, the polyurethane adhesive composition may itself contain photocurable monomers and associated photoinitiator, or a photoactivated polyurethane catalyst, in which case the additional composition sprayed onto the polyurethane adhesive 8 by spray nozzle 12 becomes superfluous or optional. Ultraviolet lamp 20, or another actinic radiation generating device such as a laser, electron beam, etc., is used to expose the surface of the polyurethane adhesive, which cures at its surface, as a result.

In all of the foregoing embodiments, the Figures have been simplified for ease of viewing and understanding. In commercial embodiments, various tension controlling devices, tenter frames, drive motors, etc., will be required, as is well known to those skilled in the art. Depending upon the adhesive viscosities, weight pickup desired, depth of tufting through the primary backing, and other well known factors, additional coating stations or additional doctor blades, nip rolls, impregnation rollers, and the like may be required for any particular application. Design and fabrication of such devices is within the skill of the art.

The polyurethane adhesive systems of the subject invention must be formulated and/or processed so as to eliminate dripping, running, etc., when used in a face up carpet manufacturing configuration. There are three methods of achieving these objectives, which may be employed separately or may be employed together. In the first method, a non-Newtonian thickener is added to the reactive polyurethane, which is generally in the form of a filled froth. The non-Newtonian thickener raises the viscosity, but the viscosity is highly shear dependent. For example, under high shear rates, the viscosity is low. Such high shear rates occur at the point of adhesive application, for example at doctor bars, impregnation rollers, etc. The low viscosity under these conditions allows the reactive polyurethane to thoroughly penetrate exposed tufts and primary backing, ensuring adequate tuft bind. Under conditions of low shear, however, for example while traversing the curing oven, the viscosity is quite high.

A second method enabling processing of urethane adhesives face up is to employ a polyurethane reactive system which contains an additive which causes the viscosity decrease with increasing temperature to be less severe then if the additive were not present. Such an additive may be called a viscosity index improver. Among the possible additives which are suitable as viscosity index improvers are the same additives as the non-Newtonian thickeners.

It has been surprisingly discovered that the decrease in viscosity which occurs as the temperature rises is far less severe than in other systems not employing non-Newtonian thickeners. For example, whereas a conventional mineral filled polyurethane adhesive may exhibit loss of 85% or more of its room temperature viscosity when heated to 70° C., the non-Newtonian thickened formulations of the present invention exhibit only a 25% loss in viscosity under the same circumstances. Suitability of a targeted additive as a viscosity index improver may be addressed by measuring the viscosities of otherwise identical polyurethane adhesives, one of which contains the additives, and one which does not. An additive which causes the change (decrease) in viscosity between 25° C. and 70° C. to be reduced is an index improving additive. As previously mentioned, some viscosity index improving additives may also be non-Newtonian thickeners, but this is not necessarily the case.

The third method of enabling face up carpet manufacture using polyurethane adhesives is to markedly increase the surface viscosity of the adhesive, for example, by formation of a cured or partially cured layer of adhesive on the carpet bottom. This layer prevents liquid adhesive from dripping through, acting as a film or "shield". The thin, partially cured skin, film, or surface layer may be formed by any means which results in at least a partial cure of the exposed adhesive surface or development of a highly viscous or solid surface. One method is to employ photoactive catalysts in the polyurethane. Since the actinic radiation which renders photocatalysts active, generally ultraviolet (UV) light, cannot penetrate deeply into the reactive polyurethane adhesive froth owing to its cellular nature and presence of mineral filler, only a surface cure is effected.

A further means of viscosifying the adhesive surface is to spray or coat the adhesive with a very reactive formulation which rapidly cures in and of itself, or which causes local cure of the polyurethane adhesive. An example of the former is a rapidly crosslinkable composition such as a di- or triacrylate either neat or dissolved in solvent, and containing a free radical initiator or photoinitiator. Preferably, any such crosslinkable compositions contain monomers and oligomers of relatively low volatility. Glycerol triacrylate is one example of such a low volatility monomer, which may be used in combination with a soluble peroxide or azo-type catalyst, or a photocatalyst such as the Irgacure® catalysts available from Ciba Geigy.

To ensure adherence of the photopolymerized coating with the carpet adhesive, monomers which are reactive with the polyurethane adhesive may be used. Examples isocyanatoethylmethacrylate, hydroxyethylacrylate, and 1-(t-butylisocyanato)-3-isopropenylbenzene. Such monomers may be used in conjunction with other unsaturated compounds, particularly those with multiple unsaturation such as bisacrylates, divinylethers, etc., or alone. They may also be added to the polyurethane adhesive to imbue the latter with photocuring ability.

A yet further means of viscosifying the adhesive is to spray the adhesive with a solution which rapidly reacts with or catalyzes the reaction of the polyurethane adhesive at its surface. Examples of solutions which can rapidly react are solutions of amines and alkanolamines, for example an aqueous solution of ethylene diamine. Examples of compositions which can case local catalysis are ethylene glycol solutions of tin, tertiary amine, or bismuth polyurethane catalysts. When secondary backings are utilized, non-advancing viscosifying skip coats containing elevated catalyst levels and/or highly reactive species may be used, the skip coat contacting the secondary backing prior to its marriage to the adhesive-coated greige good. Skip coating may also be used to apply reactive or catalytic compositions to the polyurethane adhesive surface when secondary backings are not used.

Except for the non-Newtonian fillers, viscosity index improvers, and photocatalysts when present, the polyurethane adhesives of the subject invention are conventional. In general, these contain one or more polyoxyalkylene polyols, a di- or polyisocyanate, curing catalysts, cell control agents (frothing surfactants), mineral fillers, dyes, pigments, etc. Often, the polyol and isocyanate components may be pre-reacted to form an isocyanate-terminated prepolymer or quasi-prepolymer. Mixtures of polyols, isocyanates, and prepolymers and/or quasi-prepolymers are also useful.

Examples of suitable preferred isocyanates are toluene diisocyanate (TDI) and methylene diphenylene diisocyanate (MDI), and their mixtures. MDI need not be used in the form of the pure or nearly pure 4,4'-isomer. Modified isocyanates such as urethane- and carbodiimide-modified isocyanates, particularly the former, may be used. Polymeric and crude MDI containing tri- and higher functional isocyanates may be used as well. Isocyanate-terminated prepolymers and quasi-prepolymers are also useful. It is preferable that the isocyanate index be maintained between 90 and 120, with indexes in the range of 95 to 110 more preferable.

The polyols useful are well known and may have average nominal functionalities ranging from about 2 to about 8, preferably in the range of 2 to 3. The polyols may be polytetramethylene ether glycols (PTMEG), hydroxyl-functional polyester polyols, or preferably polyoxypropylene polyols which may be homopolymeric or may be a copolymer containing other copolymerizable monomers such as ethylene oxide, butylene oxide, oxetane, etc. Polyoxyalkylene polyols may be prepared by base catalyzed oxyalkylation of suitably hydric initiator molecules, and may advantageously be low or ultra-low unsaturation polyols having levels of intrinsic unsaturation less than about 0.015 meq/g, preferably lower than 0.010 meq/g, and most preferably with maximum unsaturation in the range of 0.002 to 0.007 meq/g. The polyols may have equivalent weights of from about 300 Da to about 10,000 Da, preferably 1000 Da to 4000 Da, and most preferably in the range of 1500 Da to 2500 Da. The polyoxyalkylene copolymer polyols may be block, random, block-random, or any other configuration. In one shot systems, polyols with high primary hydroxyl content are especially preferred.

Isocyanate-terminated prepolymers useful herein may be prepared by conventional methodology, preferably at somewhat elevated temperature. The free isocyanate content may range from about 1 weight percent or below to about 35 weight percent or higher, more preferably 2 weight percent to about 30 weight percent, yet more preferably 6 weight percent to about 25 weight percent, and most preferably in the range of 8 weight percent to about 20 weight percent. The polyol component used to prepare the prepolymers may be one of the polyols previously described, or a lower molecular weight glycol or oligomeric glycol or polyol.

For the polyurethane systems destined for use in puddles to supply polyurethane adhesive to the greige good, a catalyst which is effective to cure the adhesive in the curing oven is necessary. However, the catalyst must not cause undue advancement of the adhesive in the puddle. For this reason, all but the most minor amounts of highly active urethane catalysts such as the various tin compounds and tertiary amines, are generally avoided. However, such catalysts may be used in conjunction with delaying compounds such as those disclosed in U.S. Pat. No. 3,635,906, herein incorporated by reference. Latent catalysts which activate at elevated temperatures, i.e., iron diacetylacetonate and nickel diacetylacetonate, are preferred. The amounts of such catalysts used should be an effective amount, i.e., an amount which provides for substantially full cure in the curing oven while exhibiting minimum advancement in the puddle.

The mineral fillers are those conventionally used, generally ground limestone, dolomite, alumina trihydrate, etc. The fillers are of relatively large particle size, for example commonly in the range of 15 $\mu$m to 40 $\mu$m, and thus have low specific (BET) surface area. The surface area of such fillers is, in general, less than 5 $m^2/g$. Amounts of filler vary quite widely, but amounts of from 50 parts filler per 100 parts polyol or adhesive to 500 parts filler per 100 parts polyol or adhesive have been used. Amounts of from about 100 parts per 100 parts polyol to 300 parts per 100 parts polyol are typical. It should be noted that these fillers do not cause any substantial non-Newtonian behavior.

The non-Newtonian thickeners may be any thickener which exhibits a substantial inverse relationship between shear and viscosity. In general, inorganic particulates having BET surface areas greater than about 10 $m^2/g$, preferably greater than 40 $m^2/g$, more preferably greater than 100 $m^2/g$, and yet more preferably 200 $m^2/g$ or more, are suitable. The thickeners may be hydrophobic or hydrophilic in nature. Examples include precipitated calcium carbonate, finely divided clays, preferably smectite or "layered" clays, and precipitated and "fumed" silicas, i.e., silicas produced by flame pyrolysis processes and the like. Such thickeners are well known and available from numerous sources, including General Electric, Dow Corning Silicones, Wacker-Chemie GmbH and Wacker Silicones Corporation, Rhone-Poulenc, and Degussa, among others. Inorganic thickeners are used in amounts which preferably at least double the resting viscosity as opposed to the viscosity exhibited under a shear rate of 50 $sec^{-1}$. More preferably, the rest viscosity at 25° C. is more than three times the viscosity at a shear rate of 50 $sec^{-1}$ or more, most preferably more than ten times this viscosity. Preferably, amounts of about 0.25 to 20 parts per 100 parts of the B-side, more preferably 1 to 2 parts of inorganic non-Newtonian thickener are used.

Since the action of non-Newtonian particulate thickeners is due, at least in part, to surface infractions, the nature of the surface will cause the amount of thickener as well as its overall effect to vary somewhat. However, adjustment of the amount of thickener can be easily accomplished. For example, thickeners with a relatively hydrophilic surface (organophobic) may be less effective than hydrholic thickeners having the same size and morphology. Some fillers, i.e., fumed silicas, may tend to aggregate and subsequently agglomerate.

Fillers such as fumed silica tend to have relatively small particle sizes, and are highly efficient non-Newtonian thickeners. For example, Aerosil® 200, with an average particle size of 0.012 $\mu$m (12 nm) is only required in amounts of 1 to 2 weight percent to be effective, whereas precipitated and surface treated calcium carbonate, with an average particle size of 0.15 $\mu$m, approximately an order of magnitude larger, requires 5–20 weight percent to be effective, these weight percents based on the weight of the isocyanate reactive components. In general, average particle size must be less than 1 $\mu$m, preferably less than 0.3 $\mu$m, and most preferably less than 0.1 $\mu$m.

Organic thickeners which display non-Newtonian characteristics are also useful. An expedient way to test a particular thickener for its non-Newtonian thickening ability is to add the thickener to a target polyurethane adhesive "B-side" (resin side), and measure its viscosity at different levels of shear. Thickeners which exhibit a substantial inverse relationship between viscosity and shear are non-Newtonian. Candidate thickeners include the various vegetable gums, i.e. carrageenan, tragacanth, acacia, guar, and the like; modified celluloses, e.g., carboxymethylcellulose, carboxypropylcellulose, hydroxymethylcellulose, and the like; polyacrylic acid polymers and copolymers with acrylates and other unsaturated monomers, e.g., the Carbopol™ and Acrysol™ thickeners; very high molecular weight polyethers, such as high molecular weight polyoxyethylene glycol, and the like. Associative thickeners may be particularly effective. Associative thickeners are molecules which have a hydrophobic or non-polar portion and a hydrophilic, polar, or ionic portion. In solution, the non-polar portions tend to associate with each other, as do the hydrophilic, polar, or ionic portions, forming extraordinarily long "associative" chains and networks. The interactions are easily broken by shear, however, and thus the molecules exhibit decidedly non-Newtonian behavior. Combinations of organic non-Newtonian and inorganic non-Newtonian thickeners may be used as well. Examples of non-Newtonian thickeners may be found in U.S. Pat. Nos. 4,709,099 and 4,649,224. It is possible to tailor the properties of certain of the polyols to serve as non-Newtonian thickeners.

For the aspect of the subject invention where local, surface viscosity is raised, the subject invention process preferably employs a secondary backing along with a non-advancing, viscosifying composition, preferably in the form of a non-advancing skip coat.

The skip coat composition may take several distinct forms. Skip coating has been used before in latex adhesive systems, but has not been used in polyurethane systems due to the problem of the polyurethane setting up in the skip roll trough. In the present invention, this problem is circumvented by employing a "non-advancing skip coat." By the term "non-advancing" is meant that the skip coat composition, by itself, exhibits very little increase in viscosity over the life of the composition in the trough, i.e., is not a "self-curing" composition. Compositions within the scope of the invention will not cure until contacted with the polyurethane adhesive coating on the greige good or until subjected to photocuring. The skip coat compositions, while in the skip roll trough, will thus exhibit little or no increase in viscosity, the skip coat weight will remain substantially constant, and there will be no need to remove accumulated gel or polymer from the skip coat trough.

The skip coat composition, or in general, the viscosifying composition as it will hereinafter be termed, may contain a "polyurethane reactive composition", or a curable film-forming composition. By "polyurethane reactive composition" is meant a composition which will become part of the overall polyurethane adhesive system by virtue of being a component of that system, by reacting with a component of that system, or by catalyzing reaction of the system. Thus, for example, the viscosifying composition may comprise an isocyanate-terminated prepolymer or quasi-prepolymer; or a mixture of polyols, i.e., polyoxyalkylene polyols, polyester polyols, polytetramethylene ether glycols, polycaprolactone diols, and the like; amino-functional polyoxyalkylene polyethers; one or more low molecular weight glycols and/or aminoalcohols; and even in some cases, may be water. When isocyanate-functional components are used in the viscosifying composition, it is preferred that a nitrogen blanket or its equivalent be used to prevent reaction with atmospheric moisture.

The viscosifying composition will also, in general, be an "adherence promoting composition." In this sense, the viscosifying composition, when applied to the secondary backing, will exhibit greater initial adhesion to the polyurethane adhesive-coated greige good than that obtained by a viscosifying composition-free secondary backing, and greater than that obtained from a skip coat which has the same composition as the greige good polyurethane adhesive when used in the same a real weight as the viscosifying compositions of the present invention.

The viscosifying composition functions to increase adhesion between the polyurethane adhesive-coated greige good and the secondary backing by providing a composition which promotes rapid and at least local cure of the greige good adhesive such that the latter's viscosity and/or tack is increased, or itself cures to become highly viscous or solid. The increase in tack/viscosity encourages initial adhesion of secondary backing to the greige good. Increased initial adhesion in turn promotes superior lamination strength in the cured carpet laminate. Most importantly, the increase in viscosity enables adhesive-coated greige good to be cured face-up without running or dripping.

The viscosifying compositions may also include a catalyst, provided that the catalyst does not catalyze the advancement of the skip coating composition. For example, a viscosifying composition employing isocyanate-terminated polyoxyalkylene polyol-derived prepolymers may include a urethane catalyst, but should not include an isocyanate trimerization catalyst. The former cannot cause substantial advancement of the skip coat composition isocyanate-terminated prepolymer as there is no hydroxyl-functional compound in the skip coat with which to react to form urethane linkages. However, trimerization catalysts are to be avoided as these may catalyze isocyanurate formation from trimerization of the free isocyanate groups of the prepolymer. Viscous polyoxyalkylene polyol or polyester polyol viscosifying compositions may include both urethane or isocyanurate catalysts, however.

The viscosifying compositions may also comprise relatively low viscosity components which contain active urethane catalysts. For example, the viscosifying composition may comprise one or more relatively low molecular weight and therefore low viscosity alkylene glycols, low molecular weight monomeric or oligomeric polyols, or alkanolamines. Examples include alkylene glycols such as ethylene glycol, diethylene glycol, triethylene glycol, propylene glycol, dipropylene glycol, tripropylene glycol, 1,3-propanediol, 1,4-butanediol, 1,6-hexanediol, 2-methyl-1,3-propanediol and the like; polyols such as glycerol, sorbitol, trimethylolpropane, and their oligomeric oxyalkylation products; and alkanolamines such as mono-, di-, and trialkanolamines. Examples of the latter are monoethanolamine, monopropanolamine, diethanolamine, triethanolamine, and the like. Water may also be used, either alone or in conjunction with other ingredients. Mixtures of low viscosity glycols, polyols, etc., may be used, as may be one or more of these with minor amounts of high molecular weight, viscous polyols and other polymers.

To provide the desired viscosity increasing function, low viscosity viscosifying compositions must contain functional groups highly reactive with isocyanate groups, e.g., primary amino groups, and/or must contain a highly active catalyst, as opposed to a latent catalyst. Examples of highly active catalysts are those catalysts known to one skilled in the art as highly effective in catalyzing the urethane reaction, for example tin catalysts, particularly tin octoate, dibutyltin diacetate, dibutyltin dilaurate, dimethyltin diacetate, and the like. Bismuth compounds are highly active. Tertiary amines are also suitable. For example, a highly effective low viscosity viscosifying composition may be formulated from ethylene glycol and dibutyltin dilaurate. Application of only relatively small amounts of such a skip coat to the secondary backing and contact with the adhesive of the greige good will cause rapid advancement, viscosification, and tack development on the adhesive, promoting firm initial adherence of the secondary backing to the greige good, and development of much higher viscosity or even solidification at the surface of the polyurethane adhesive, i.e., the interface between the adhesive and secondary backing. The same composition may be sprayed or skip coated onto the adhesive itself when a secondary backing is not to be used.

For those viscosifying compositions described above which are sprayable, such as catalyst-containing ethylene glycol mixtures, water/amine mixtures, etc., these may be sprayed onto the advancing polyurethane adhesive-coated carpet back by suitable atomizers, spray heads or guns, etc., and may be used without a secondary backing. In such cases, the sprayed-on viscosifying composition rapidly reacts at the surface of the polyurethane adhesive, partially or even fully curing the latter at its surface. Thus, this aspect of the invention may be used without any secondary backing.

The polyurethane systems employed in puddles as "precoat adhesives", "tuft bind adhesives", or "greige good adhesives" are preferred to have indices at least near stoichiometric, i.e. in the range of 90–120, but are preferably somewhat over indexed. It is preferable that the index exceed 101, and more preferably be in the range of 103 to 120. Under-indexed systems are not preferred, as tuft bind may suffer. A real weight of the precoat adhesive advantageously ranges from 20 oz/yd$^2$ to 50 oz/yd$^2$, and more preferably 25 oz/yd$^2$ to 40 oz/yd$^2$. However, these amounts are not limiting.

The precoat adhesive to be applied to the greige good preferably contains a relatively high amount of filler, for example amounts of 30 parts by weight to 350 parts by weight relative to the weight of the polyol, more preferably 50 parts by weight to 500 parts by weight. Further details with respect to formulations and mixing methods for froth foam may be had by reference to U.S. Pat. No. 5,604,267 and the references cited therein. Suitable fillers are ground or microcrystalline limestone, dolomite, barite, aluminum hydroxide, and the like.

The viscosifying composition is desirably used in considerably lesser quantities in areal weight relative to the amount of precoat adhesive. For example, with isocyanate-reactive viscosifying compositions, the applied viscosifying composition areal weight is preferably 0.05 to 1 oz/yd² (1.7 to 33 g/m²), more preferably 0.2 to 0.5 oz/yd² (6.7 to 16.7 g/m²), these quantities, again, not limiting. When isocyanate-functional viscosifying compositions are utilized, larger areal weights are tolerable, as any excess isocyanate-functionality left after marriage of greige good and secondary backing and cure between the respective reactive components will further react in the cure oven and/or with atmospheric moisture. In such cases, the preferred range is 0.05 to 2.5 oz/yd² (1.7 to 83.4 g/m²), more preferably 0.2 to 1.0 oz/yd² (6.7 to 33 g/m²). However, both larger and smaller amounts of all types of viscosifying compositions may be used as required by the particular greige good, greige good adhesive, and other raw material process parameters.

When isocyanate-reactive viscosifying compositions are used, the skip coat isocyanate-reactive functionality may be of greater reactivity than the isocyanate-reactive functionality of the adhesive. For example, when the adhesive contains a high secondary hydroxyl-functionality polyol, a polyol with considerable primary hydroxyl functionality may be used in the viscosifying compositions. In the same manner, if a primary hydroxyl polyol is used in the adhesive, e.g. one with 30% primary hydroxyl groups, a polyol with higher primary hydroxyl content may be used in the viscosifying composition. It is also possible to use amine-terminated polyols, aliphatic glycols, alkanolamines, aliphatic diamines, and the like, as well as water in the viscosifying compositions as more reactive isocyanate-reactive compounds. For example, it is possible to utilize mixtures of water and a catalyst, for example an amine catalyst, which facilitates the reaction of water with the isocyanate group. Hydroxyl-, amino-, and both hydroxyl- and amino-functional compounds having molecular weights below about 300 Da may advantageously be used.

Catalyst present in the viscosifying composition should be of sufficient type and amount that a relatively rapid cure rate is achieved following marriage of the greige good and secondary backing or application of the viscosifying composition to the surface of the polyurethane adhesive. The catalyst may constitute up to 10 weight percent of the skip coat, more preferably 0.5 to 7 weight percent, and most preferably 2 to 6 weight percent.

When sprayed onto the adhesive in the absence of attachment of secondary backing the amount of sprayed-on formulation is generally the same or less than the amount employed with a secondary backing. In such cases, adherence of secondary backing is not a consideration, and the amount of viscosifying composition formulation is only that necessary to cause sufficient local, surface cure so as to eliminate dripping, running, etc.

By the term "skip coat" as used herein is meant a coating applied to the secondary backing in most minor amount relative to the weight of adhesive applied to the greige good. By the term "viscosifying composition" is meant a formulation suitable for use as a skip coat when employing a secondary backing or which is useful for spraying onto the polyurethane adhesive for surface cure when a secondary backing is not to be used. By the term "complimentarily reactive" is meant a skip coat or viscosifying composition which is reactive with excess unreacted functionality of the adhesive, i.e. has complimentary functionality. For example, in an over-indexed adhesive with excess isocyanate functionality, a complimentarily reactive viscosifying composition will contain isocyanate-reactive functionality. Unless indicated otherwise, the use of "adhesive" in the claims refers to the precoat or tuft bind adhesive applied to the greige good which will subsequently contact the secondary backing, or which will be surface cured as described herein. This adhesive may be a liquid, may be a froth foam, or may be a foamable system, unless otherwise limited. Molecular weights and equivalent weights herein are expressed as number average molecular and equivalent weights in Daltons (Da).

The formulations presented herein may also be used in conjunction with additional non-froth adhesives/foam layers. For example, it is possible to apply a tuft bind adhesive, for example a relatively fluid froth or a liquid adhesive of relatively low viscosity to more effectively wet out the tufts in the backing side of the greige good followed by application of a further adhesive as a second layer to the greige good. More than one froth foam may be used similarly, for example froth foams containing differing filler content. In addition to or in lieu of froth foams, foams containing a volatile blowing agent or a reactive blowing agent such as water may be used.

EXAMPLE 1 and Comparative Example C1

The B-side (resin side) components of the polyurethane froth adhesives of Table 1 were mixed together. Comparative Example C1 is a typical polyurethane adhesive B-side formulation employing 180 parts filler to 100 parts polyol. Example 1 is the same formulation as Comparative Example 1, but contains 1.5 parts (per 280 parts) of Aerosil® 200 (Degussa) fumed silica as a non-Newtonian thickener.

The viscosities were measured with a CSL2-500 rheometer (TA Instruments) using parallel plates. The viscosities at various shear rates are also presented in Table 1.

TABLE 1

| FORMULATION/EXAMPLE | 1 | C1 |
|---|---|---|
| Atlantis ™ Q1000 Polyol[1] | 91 | 91 |
| Diethylene Glycol | 9 | 9 |
| Calcium Carbonate | 120 | 120 |
| Aluminum Trihydrate | 60 | 60 |
| Aerosil 200 (Degussa) | 1.5 | — |

| SHEAR RATE, sec$^{-1}$ | VISCOSITY [cps] | VISCOSITY [cps] |
|---|---|---|
| 0.011 | 200,100 | not det. |
| 0.54 | 70,770 | 14,275 |
| 3.7 | 40,890 | 16,105 |
| 40.8 | 24,150 | 15,890 |
| 174 | 11,370 | 11,440 |

[1]Lyondell Chemical

These data illustrate the shear thinning characteristic that is imparted by the thickening agent, in this case fumed silica. Without fumed silica, the viscosity is essentially independent of the shear rate. When a non-Newtonian thickener, in this case, fumed silica, is added, the viscosity becomes highly dependent on shear. At low shear rates, the viscosity increases dramatically compared to the formulation that does not contain thickener. At high shear rates, the viscosities are substantially the same. This means that both formulations behave very similarly when subjected to the high shear encountered under a doctor bar, in terms of their ability to penetrate the greige good and the carpet fibers. Once the coated greige good has passed under the doctor bar all the shear is removed, and the viscosity of the formulation containing the thickener increases from around 12,000 to more than 200,000 cps. The higher viscosity reduces the tendency of the froth to leak out of the greige good once the greige good is inverted and passed through the curing oven.

Note, that the conventional fillers are much too large in particle size (35 μm and 20 μm, respectively) to act as non-Newtonian thickeners: the viscosity at 0.54 sec$^{-1}$ is only some 25% more than that at 174 sec$^{-1}$, and is actually lower than the viscosity at 3.7 sec$^{-1}$.

A second, and most important aspect of the subject invention process lies in the use of additives which minimize the viscosity decrease at increasing temperature. This is illustrated by the data presented in Table 2, where the effect is caused by the same non-Newtonian thickeners employed in Example 1. However, other viscosity index improvers will also be acceptable. To demonstrate the effect of temperature on viscosity, viscosity measurements were made with a Brookfield viscometer using an S95 T-bar spindle as the measurement probe.

TABLE 2

| Temperature | Viscosities, sec$^{-1}$ | |
|---|---|---|
| | Example 1 | Comparative Example C1 |
| 25 | 74,990 | 16,100 |
| 40 | 63,425 | 4,400 |
| 55 | 63,125 | 3,065 |
| 70 | 56,125 | 1,905 |

The results presented in Table 2 indicate that the viscosity of the non-Newtonian thickened composition is not affected greatly by temperature. The viscosity at 70° C. is only 25.2% less then the viscosity at 25° C. However, the Comparative Example, containing no non-Newtonian thickener, exhibited an 88.2% loss in viscosity. The C1 viscosity was 8.45 times less at 70° C. then at 25° C. These results would be even more disparate if the viscosity could be measured at zero shear; however, viscosity must be measured by application of a shearing force. Note that even at 70° C., the example according to the invention, Example 1, is still more than three times as viscous as compared to Comparative Example 1 at 25° C.

EXAMPLE 2 and Comparative Example C2

The ingredients of the B-sides of Examples 1 and C1 were frothed in a kitchen mixer using a wire mesh impeller. To the frothed mixtures were added, respectively, 1.5 parts LC 5615 polyurethane catalyst (Witco), and 65.2 parts Baytuft® 751 (Bayer), and thoroughly mixed. This mixture was then applied to a 6 pic woven propylene backing. The coated backing was then lifted and clamped to the rim of a 7×11 inch rectangular baking pan such that the coated backing was suspended about 0.5" inch about the bottom of the pan. This assembly was then placed into a curing oven set at 150° C. for approximately 5 minutes. After curing and cool-down, the parts of the backing that were located above and near the rim of the pan were removed resulting in carpet pieces measuring 9.5 by 4.5 inches. The amount of urethane applied to these samples was determined to be around 27 grams for both the Example and the Comparative Example. The sample processed according to the subject invention displayed a smooth appearance on both sides of the sample. The comparative example showed severe run-off and drip-formation on the underside of the sample.

EXAMPLES 3–5 and Comparative Example C3

Polyurethane froth adhesives were prepared by mixing the B-sides of Table 3 with 56 parts of Baytuft® 751. The froths were applied to the reverse side of a 30 oz/yd$^2$ (ca. 1.2 Kg/m$^2$) loop carpet made of 1250 denier, 2-ply nylon fiber tufted through a woven polypropylene primary backing at 8×10 stitches per inch (3.1×3.9 stitches/cm) in a straight stitch pattern. In case of examples 4 and 5, a skip-coated secondary backing was applied to the back of the carpet. The skip-coat consisted of 95.6 parts of Acclaim® 2220 (Lyondell Chemical), 2 parts dimethyltin dilaurate catalyst and 2.4 parts of triethylenediamine catalyst. As secondary backing, a 6-pic woven polypropylene backing was used.

Immediately after the application of the froth and the secondary backing in examples 4 and 5, the samples were attached to a wire mesh with clamps. The mesh with the attached carpet sample was then suspended in a curing oven with the carpet facing up. The samples were cured for about 5 minutes at 130° C.

TABLE 3

| Formulation/Example | 3 | 4 | 5 | C3 |
|---|---|---|---|---|
| Atlantis ® Q1000 | 92 | 92 | 92 | 92 |
| diethylene glycol | 8 | 8 | 8 | 8 |
| LC 5615 catalyst | 1.5 | 1.5 | 1.5 | 1.5 |
| Calcium carbonate | 80 | 80 | 80 | 80 |
| Aerosil 200 | 1.5 | 1.5 | — | — |
| Skip Coated | No | Yes | Yes | No |

The applied weights for all the samples ranged from 38 to 40 oz/yd$^2$. Comparative example C3 had an unacceptable appearance. The surface of the backing was uneven with drip lines and noses of urethane extending as much as 1 cm away from the backing, indicating severe leakage of the urethane froth from the greige good. Examples 3, 4 and 5 had good appearance without indications of froth leakage. Example 3 shows the effectiveness of the thickening agent alone. Example 5 shows the effectiveness of the surface viscosifying process alone. Example 4 shows the effectiveness of the combination of thickening agent and the surface viscosifying processes.

EXAMPLES 6 and 7 and Comparative Examples C4 and C5

TABLE 4

| Formulation-/Example | 6 | 7 | C4 | C5 |
|---|---|---|---|---|
| Q1000 (Lyondell) | 91 | 91 | 91 | 91 |
| Diethylene Glycol | 9 | 9 | 9 | 9 |
| Calcium Carbonate, WF-70 (Georgia Marble) | 100 | 110 | 120 | 100 |
| Aluminum Trihydrate, CG60-U (Costum Grinders) | 60 | 60 | 60 | 60 |
| Precipitated Calcium Carbonate, Thixo-Carb 500 (Specialty Minerals Inc.) | 20 | 10 | — | — |
| Precipitated Calcium Carbonate, Albacar 5970 (Specialty Minerals Inc.) | 0 | 0 | 0 | 20 |

The examples were prepared such that the total amount of fillers used in the B-side remained constant at 180. The ingredients of the B-sides of Examples 6, 7 and C4, C5 were frothed in a kitchen mixer using a wire mesh impeller. To the frothed mixture were added, respectively 1.5 parts LC 5615 polyurethane catalyst (Witco), and 63.6 parts Baytuft 751 (Bayer), and thoroughly mixed. About 44 to 47 g of the mixture was then applied to a 11 pic woven propylene backing which was previously clamped to the rim of a 9×13 inch rectangular baking pan. The area covered with froth measured slightly above 5×5 inch. This assembly was then placed into a curing oven set at 150° C. for approximately 5 minutes. After curing and cool-down, 5×5 inch areas covered with urethane were cut out and weighted. The amount of urethane, which dripped through the secondary backing and collected in the bottom of the pan, was also measured. Table 5 summarizes the results.

TABLE 5

| Formulation/Example | 6 | 7 | C4 | C5 |
|---|---|---|---|---|
| Weight of 5 × 5 inch secondary coated with urethane [gr] | 46 | 43 | 38 | 31 |
| Weight of urethane collected in bottom of pan [gr] | 0 | 0 | 4 | 12 |

The under side of the backing in Examples 6 and 7 were smooth without any drip through of material. The urethane was completely retained by the secondary backing. Comparative examples C4 and C5 showed significant dripping into the pan with severe nose formation and protrusion through the windows of the secondary. These examples demonstrate the effectiveness of precipitated calcium carbonate as well as the importance of the particle size. The average particle size of the precipitated calcium carbonate used in examples 6 and 7 is approximately 0.15 μm whereas the average particle size of the precipitated calcium carbonate used in C5 is 1.9 μm. Note that the average particle size of the aluminum trihydrate is about 20 μm and the average particle size of the ground marble is about 35 μm.

The carpet adhesive compositions disclosed and claimed herein require one ingredient from each necessary class of ingredients. Necessary ingredients include at least one di- or polyisocyanate, prepolymer, and/or quasi-prepolymer, at least one isocyanate-reactive component: for the first embodiment herein, a non-Newtonian thickener, and for the second embodiment, a viscosity index improving additive. In the third embodiment, the process requires that the surface viscosity of the polyurethane adhesive on the greige good be increased to the extent that flow from the interior of the adhesive past the viscosified surface is minimized or prevented. The invention may be practiced with any combination of classes of ingredients or specific ingredients within those classes to the exclusion of other ingredients or process steps named or unnamed.

By the term "viscosifying" when used describing the surface of the polyurethane precoat or greige good adhesive is meant increasing the viscosity beyond the viscosity of the unaltered adhesive at the surface such that "leaking" or "running" of the adhesive from the interior is reduced or eliminated when cured upside down at elevated temperature. The viscosified surface may be still flowable (liquid) or solid, and may comprise substantially the same composition as the uncured adhesive, or may be a different applied polymer system which cures to form a viscous layer or cured film. By the term "carpet construction adhesive" is meant an adhesive used in the manufacturing of tufted carpet. While the aim of the present invention is to allow the drip-free, face-up curing of carpeting prepared using polyurethane adhesives, the carpeting may be run face-down employing the inventive compositions as well.

Having now fully described the invention, it will be apparent to one of ordinary skill in the art that many changes and modifications can be made thereto without departing from the spirit or scope of the invention as set forth herein.

What is claimed is:

1. In a process for the preparation of tufted carpeting wherein a tuft bind adhesive is applied to tufts penetrating a primary backing, the improvement comprising employing polyurethane adhesive as the tuft bind adhesive, and employing one or more drip-reducing processes, said processes selected from the group consisting of
   a) selecting as a tuft bind adhesive, a polyurethane adhesive containing a non-Newtonian thickener such that the viscosity measured at a shear rate of less than 1 sec$^{-1}$ is more than double the viscosity measured at a shear rate of at least 50 sec$^{-1}$, both viscosities measured at the same temperature; and
   b) selecting as a tuft bind adhesive, a polyurethane adhesive containing a viscosity index improving additive such that the decrease in viscosity of the adhesive at temperatures higher than ambient temperature is reduced as compared to an otherwise identical adhesive not containing the viscosity index improving additive; wherein said polyurethane adhesive is a liquid adhesive comprising one or more isocyanate-functional components, and one or more isocyanate-reactive components.

2. The process of claim 1, wherein said non-Newtonian thickener is an inorganic thickener having a specific surface area about 10 m$^2$/g or greater.

3. The process of claim 2, wherein said inorganic thickener is present in an amount of from about 0.25 to 20 parts per 100 parts of isocyanate-reactive ingredients in the polyurethane adhesive.

4. The process of claim 2, wherein said inorganic non-Newtonian thickener is selected from the group consisting of precipitated calcium carbonate, clay minerals, fumed silica, and mixtures thereof.

5. The process of claim 2, wherein said inorganic non-Newtonian thickener comprises fumed silica having a BET surface area greater than 40 m$^2$/g, present in an amount of from about 0.25 to about 5 parts by weight per 100 parts by weight of isocyanate-reactive components.

6. The process of claim 2 wherein said inorganic non-Newtonian thickener has a mean particle size less than 1 μm.

7. The process of claim 2 wherein said inorganic non-Newtonian thickener has a mean particle size less than 0.3 μm.

8. The process of claim 2 wherein said thickener forms aggregates and/or agglomerates.

9. The process of claim 1 wherein an organic non-Newtonian thickener is employed.

10. The process of claim 9 wherein said organic non-Newtonian thickener is an associative thickener.

11. The process of claim 1, wherein the viscosity of said adhesive at a first, high rate of shear is within 20% of the viscosity of an adhesive of the same formulation but devoid of non-Newtonian thickener, and is at least three times the viscosity of the non-Newtonian thickener-devoid composition at a second, lower rate of shear.

12. The process of claim 1 wherein the viscosity of the adhesive at low shear is such that carpeting having the adhesive applied thereto can be run face up in a curing oven maintained between 100° C. and 150° C. without dripping.

13. In a process for the face up cure of tufted carpeting, the improvement comprising selecting a greige good coated with polyurethane adhesive as a tuft bind adhesive and/or a secondary backing adhesive and employing the process of claim 1.

14. In a process for the face up cure of tufted carpeting, the improvement comprising selecting a greige good coated with polyurethane adhesive as a tuft bind adhesive and/or a secondary backing adhesive and employing the process of claim 2.

* * * * *